(12) United States Patent
Greenberg et al.

(10) Patent No.: US 6,347,479 B1
(45) Date of Patent: Feb. 19, 2002

(54) CHRISTMAS TREE WATERING APPARATUS

(76) Inventors: William Arthur Greenberg, 2059 LaCrosse Ave., St. Paul, MN (US) 55119; Judson Daniel Evans, 1130 Century Ave. So., Maplewood, MN (US) 55119

( * ) Notice: Subject to any disclaimer, the term of this patent is extended or adjusted under 35 U.S.C. 154(b) by 0 days.

(21) Appl. No.: 09/425,929

(22) Filed: Oct. 25, 1999

(51) Int. Cl.[7] .......................... A09G 29/00; A47G 33/12
(52) U.S. Cl. .......................................... 47/48.5; 47/40.5
(58) Field of Search ................................ 47/40.5, 48.5, 47/79; 248/75, 76, 80

(56) References Cited

U.S. PATENT DOCUMENTS

| | | | | |
|---|---|---|---|---|
| 1,809,550 A | * | 6/1931 | Farrar | |
| 3,697,026 A | * | 10/1972 | Hambrick | 248/46 |
| 5,158,254 A | * | 10/1992 | Remby | 248/76 |
| 5,349,997 A | * | 9/1994 | Rial | 47/40.5 X |
| 5,410,839 A | * | 5/1995 | Granger | 47/40.5 |
| 6,095,462 A | * | 8/2000 | Morgan | 248/82 |

* cited by examiner

Primary Examiner—Peter M. Poon
Assistant Examiner—Jeffrey L. Gellner
(74) Attorney, Agent, or Firm—Thomas B. Tate

(57) ABSTRACT

A Christmas tree watering apparatus which allows the tree to be watered without crawling under the tree. The apparatus includes a funnel, an upspout, two lengths of pipe, and a downspout, all supported by a stand which rests on the floor and has a loop which fits around one of the pipes to hold the apparatus in position.

1 Claim, 1 Drawing Sheet

CHRISTMAS TREE WATERING APPARATUS

BACKGROUND OF THE INVENTION

The field of the invention is devices for watering Christmas trees.

The following U.S. Patents describe Christmas tree watering devices: U.S. Pat. No. 5,446,993 to Cullen; U.S. Pat. No. 5,076,009 to Cibor; U.S. Pat. No. 5,349,997 to Rial; U.S. Pat. No. 5,327,677 to Rivera; U.S. Pat. No. 5,894,695 to Stellatos; U.S. Pat. No. 5,791,083 to Giangrossi; U.S. Pat. No. 5,299,381 to Oldenburg Jr.; U.S. Pat. No. Des. 380,946 to Peaphon; U.S. Pat. No. 5,809,691 to Frantz; U.S. Pat. No. 2,938,304 to Thomas et al.; U.S. Pat. No. 5,799,437 to Evans et al.; U.S. Pat. No. Des. 373,939 to Swerdlick et al.; U.S. Pat. No. 4,850,137 to Foster; U.S. Pat. No. 5,513,677 to McCurry; U.S. Pat. No. 5,493,277 to Pierce et al.; U.S. Pat. No. 5,473,838 to Denbigh; U.S. Pat. No. 5,615,516 to Brown; and U.S. Pat. No. 5,661,926 to Granger. None of these prior art patents show the combination of features disclosed in the present invention.

SUMMARY OF THE INVENTION

The invention is a Christmas tree watering apparatus which comprises a funnel, an upspout, two pieces of pipe which form a conduit, and a downspout, with a support stand supporting the conduit. The downspout is positioned into the Christmas tree stand so that water poured into the funnel runs down the conduit into the Christmas tree stand.

An advantage of the invention is that a person can water the Christmas tree without having to crawl under the tree to pour water into the Christmas tree stand.

Another advantage is that, unlike prior art devices, this apparatus does not need to be fastened to the Christmas tree, thus avoiding damage to the tree.

Another advantage is that the apparatus can be easily assembled for use and disassembled for storage.

DESCRIPTION OF THE DRAWING

The FIGURE is a side view.

DESCRIPTION OF THE INVENTION

The invention is a Christmas tree watering apparatus which can be used to water a Christmas tree which is positioned in a conventional Christmas tree stand 12 which rests upon the floor of a building.

The apparatus includes two pipes 1 and 2 which connect to each other to form a conduit, with the connection between pipes 1 and 2 being in the center. The second pipe 2, which forms the upper end of the conduit, friction fits into the first pipe 1, which forms the lower end of the conduit, and is given a slight twist to secure it in position. Pipes 1 and 2 are preferably made of plastic material such as polyvinyl chloride.

A downspout 3 is permanently attached to pipe 1 and is heat bent to the desired angle, preferably about one hundred ten degrees. An upspout 4 is permanently attached to pipe 2 and is heat bent to the desired angle, preferably about ninety degrees. A funnel 5 is removably positioned inside upspout 4 and is friction fit to maintain the funnel 5 in an upright position.

A support stand 7, which is preferably made of plastic, has a triangulated bottom end which rests upon the floor and a loop 11 which fits around pipe 2. To attach the support stand 7, pipes 1 and 2 are disconnected, and loop 11 is pushed onto pipe 2, where it is friction fit into position. When the watering apparatus is in use, it rests against the Christmas tree with the downspout 3 positioned above or in the Christmas tree stand 12, but the apparatus does not need to be fastened to the tree. This is because the support stand 7 maintains the apparatus in position above the floor, with the conduit forming an angle of about five degrees from the horizontal.

To use the apparatus, water is poured into the funnel 5 and is carried by gravity through pipes 2 and 1 into the Christmas tree stand 12.

We claim:

1. An apparatus for watering a Christmas tree in a Christmas tree stand on the floor, said apparatus consisting of:

two pieces of pipe connected together to form a conduit, said pieces of pipe comprising a first pipe which forms the lower end of said conduit and a second pipe which forms the upper end of said conduit, said second pipe friction fitting into said first pipe at a junction which is approximately midway along the length of said conduit;

a downspout permanently connected to said lower end of said conduit which is proximal to said Christmas tree stand when in use, said downspout being bent to an obtuse angle;

an upspout permanently connected to said upper end of said conduit which is distal to said Christmas tree stand when in use, said upspout being bent to approximately a right angle;

a funnel removably positioned inside said upspout such that said funnel is maintained in an upright position by means of friction;

a support stand which rests upon said floor, said support stand having a solid triangulated bottom end, and having its top end formed into a loop which encircles said conduit so as to maintain said conduit at an angle of approximately five degrees from the horizontal above said floor.

\* \* \* \* \*